United States Patent
Xiao et al.

(10) Patent No.: US 11,555,921 B2
(45) Date of Patent: Jan. 17, 2023

(54) METHOD AND APPARATUS FOR PREDICTING SEVERE CONVECTION WEATHER

(71) Applicant: BEIJING BAIDU NETCOM SCIENCE AND TECHNOLOGY CO., LTD., Beijing (CN)

(72) Inventors: Huihui Xiao, Beijing (CN); Lei Nie, Beijing (CN); Jiangliang Guo, Beijing (CN); Xu Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 504 days.

(21) Appl. No.: 16/721,488

(22) Filed: Dec. 19, 2019

(65) Prior Publication Data

US 2020/0371230 A1 Nov. 26, 2020

(30) Foreign Application Priority Data

May 24, 2019 (CN) .......................... 201910440054.2

(51) Int. Cl.
*G01S 13/95* (2006.01)
*G01W 1/10* (2006.01)
(Continued)

(52) U.S. Cl.
CPC ............... *G01S 13/95* (2013.01); *G01W 1/10* (2013.01); *G06N 3/0454* (2013.01); *G06N 3/08* (2013.01)

(58) Field of Classification Search
CPC ........ G01S 13/95; G01S 7/417; G01S 13/951; G01W 1/10; G01W 2201/00;
(Continued)

(56) References Cited

U.S. PATENT DOCUMENTS 5,406,481 A * 4/1995 Shinozawa ........... G01S 15/885
702/3
7,391,358 B2 * 6/2008 Dupree .................. G01S 13/89
342/25 R
(Continued)

FOREIGN PATENT DOCUMENTS

CN 107703564 A 2/2018
CN 108427989 A 8/2018
(Continued)

OTHER PUBLICATIONS

Shi et al., Convolutional LSTM Network: A Machine Learning Approach for Precipitation Nowcasting (Year: 2016).*
(Continued)

*Primary Examiner* — Mohammad K Islam
(74) *Attorney, Agent, or Firm* — Seed IP Law Group LLP (57) ABSTRACT

Embodiments of the present disclosure provide a method and apparatus for predicting a severe convection weather. The method may include: acquiring a current radar echo map sequence, the current radar echo map sequence being a radar echo map sequence within a current time period; generating, based on the current radar echo map sequence, a future radar echo map sequence, the future radar echo map sequence being a radar echo map sequence within a future time period; and inputting the future radar echo map sequence into a pre-trained severe convection weather predicting model to obtain a severe convection weather intensity predicting map, where the severe convection weather predicting model is used to predict the intensity of a severe convection weather.

14 Claims, 5 Drawing Sheets

(51) Int. Cl.
*G06N 3/08* (2006.01)
*G06N 3/04* (2006.01)

(58) Field of Classification Search
CPC ........ G06N 3/0454; G06N 3/08; Y02A 90/10; G06Q 10/04; G06Q 50/26
See application file for complete search history.

(56) References Cited

U.S. PATENT DOCUMENTS

| | | | |
|---|---|---|---|
| 7,542,852 B1 * | 6/2009 | Rose | G01W 1/10 73/170.16 |
| 10,613,252 B1 * | 4/2020 | Mecikalski | G06F 17/10 |
| 2003/0018435 A1 * | 1/2003 | Jenner | G01V 1/362 702/14 |
| 2004/0239550 A1 * | 12/2004 | Daly, Jr. | G01S 13/953 342/26 B |
| 2007/0005249 A1 | 1/2007 | Dupree et al. | |
| 2020/0132884 A1 * | 4/2020 | Rothenberg | G06N 20/00 |
| 2021/0103051 A1 * | 4/2021 | Tang | G01S 13/951 |

FOREIGN PATENT DOCUMENTS

| | | |
|---|---|---|
| CN | 108710114 A | 10/2018 |
| CN | 108732550 A | 11/2018 |
| CN | 108734357 A | 11/2018 |
| JP | 9-257951 A | 10/1997 |
| JP | 10-177076 A | 6/1998 |
| KR | 101435648 | 8/2014 |
| KR | 10-1483617 | 1/2015 |

OTHER PUBLICATIONS

Wang et. Al. ,PredRNN: Recurrent Neural Networks for Predictive Learning using Spatiotemporal LSTMs, (Year: 2017).*

Korean Notice of Allowance for Korean Application No. 9-5-2021-085111016, dated Oct. 28, 2021, 2 pages.

Singh et al., "A Deep Learning Based Approach With Adversarial Regularization for Doppler Weather Radar Echo Prediction," IGARSS 2017, 4 pages.

* cited by examiner

METHOD AND APPARATUS FOR PREDICTING SEVERE CONVECTION WEATHER

CROSS-REFERENCE TO RELATED APPLICATIONS

This application claims priority to Chinese Patent Application No. 201910440054.2, filed on May 24, 2019, titled "Method and apparatus for predicting severe convection weather," which is hereby incorporated by reference in its entirety.

TECHNICAL FIELD

Embodiments of the present disclosure relate to the field of computer technology, and specifically to a method and apparatus for predicting a severe convection weather.

BACKGROUND

The severe convection weather refers to a disastrous weather with short-term heavy rainfall, thunderstorm, tornado, hail, squall lines, or the like. Such weather is destructive, and is disastrous with short duration, severity and strong destructiveness. The severe convection weather is listed as the fourth most disastrous weather in the world after tropical cyclones, earthquakes and floods.

The severe convection weather is most difficult to predict in all weather types. In addition, the severe convection weather is less available for research than the general weather types, and is difficult to predict accordingly. At present, the severe convection weather is mainly predicted manually by predictors. That is, experienced predictors track the latest radar echo map in time, and predict the severe convection weather by analyzing the cloud motion characteristics in the radar echo map.

SUMMARY

Embodiments of the present disclosure provide a method and apparatus for predicting a severe convection weather.

In a first aspect, an embodiment of the present disclosure provides a method for predicting a severe convection weather, including: acquiring a current radar echo map sequence, the current radar echo map sequence being a radar echo map sequence within a current time period; generating, based on the current radar echo map sequence, a future radar echo map sequence, the future radar echo map sequence being a radar echo map sequence within a future time period; and inputting the future radar echo map sequence into a pre-trained severe convection weather predicting model to obtain a severe convection weather intensity predicting map, wherein the severe convection weather predicting model is used to predict an intensity of a severe convection weather.

In some embodiments, the generating, based on the current radar echo map sequence, a future radar echo map sequence includes: inputting the current radar echo sequence into a pre-trained radar echo extrapolation predicting model to obtain the future radar echo map sequence.

In some embodiments, before inputting the current radar echo sequence into the pre-trained radar echo extrapolation predicting model to obtain the future radar echo map sequence, the method further includes: pre-processing the current radar echo map sequence, where the preprocessing comprises at least one of: clear-air echo filtering, failure echo filtering, or fixed noise filtering.

In some embodiments, the pre-processing the current radar echo map sequence includes: setting, for a current radar echo map in the current radar echo map sequence, a pixel value of a pixel lower than a preset pixel value in the current radar echo map to a preset value.

In some embodiments, the pre-processing the current radar echo map sequence includes: removing the current radar echo maps at least within the preset time period of a missing current radar echo map from the current radar echo map sequence.

In some embodiments, the method further includes: determining whether the severe convection weather intensity predicting map satisfies a warning condition; and sending an alarm command in response to determining that the severe convection weather intensity predicting map satisfies the warning condition.

In some embodiments, the severe convection weather predicting model comprises a first encoder and a first decoder, the first encoder including a convolutional layer and a down-sampling layer, and the first decoder including a de-convolutional layer and an up-sampling layer.

In some embodiments, the severe convection weather predicting model is trained by: acquiring training samples, the training samples comprising historical radar echo map sequences and real historical severe convection weather intensity maps; and training the predicting model based on the training samples by using a deep learning method to obtain the severe convection weather predicting model.

In some embodiments, the training the predicting model based on the training samples by using a deep learning method to obtain the severe convection weather predicting model includes: training the predicting model, using the historical radar echo map sequences in the training samples as inputs and the real historical severe convection weather intensity maps in the training samples as outputs, to obtain the severe convection weather predicting model.

In some embodiments, the training the predicting model based on the training samples by using a deep learning method to obtain the severe convection weather predicting model includes: performing, based on the real historical severe convection weather intensity maps in the training samples, storm maturity labeling on the historical radar echo map sequences in the training samples to generate storm maturity labeling map sequences; and training the predicting model using the storm maturity labeling map sequences as inputs and the real historical severe convection weather intensity maps in the training samples as outputs to obtain the severe convection weather predicting model.

In some embodiments, after inputting the future radar echo map sequence into the pre-trained severe convection weather predicting model to obtain the severe convection weather intensity predicting map, the method further includes: acquiring real severe convection weather intensity maps corresponding to the future radar echo map sequence; generating, based on the future radar echo map sequence and the real severe convection weather intensity maps, new training samples; and training the severe convection weather predicting model based on the new training samples to update the severe convection weather predicting model.

In some embodiments, the radar echo extrapolation predicting model comprises a second encoder and a second decoder, the second encoder including a convolutional layer, a long short-term memory layer, and a down-sampling layer, and the second decoder including a de-convolutional layer, a long short-term memory layer, and an up-sampling layer.

In a second aspect, an embodiment of the present disclosure provides an apparatus for predicting a severe convection weather, including: an acquiring unit, configured to acquire a current radar echo map sequence, the current radar echo map sequence being a radar echo map sequence within a current time period; a generating unit, configured to generate, based on the current radar echo map sequence, a future radar echo map sequence, the future radar echo map sequence being a radar echo map sequence within a future time period; and a predicting unit, configured to input the future radar echo map sequence into a pre-trained severe convection weather predicting model to obtain a severe convection weather intensity predicting map, where the severe convection weather predicting model is used to predict an intensity of a severe convection weather.

In some embodiments, the generating unit includes: a generating subunit, configured to input the current radar echo sequence into a pre-trained radar echo extrapolation predicting model to obtain the future radar echo map sequence.

In some embodiments, the generating unit further includes: a preprocessing subunit, configured to pre-process the current radar echo map sequence, where the preprocessing includes at least one of: clear-air echo filtering, failure echo filtering, or fixed noise filtering.

In some embodiments, the pre-processing subunit is further configured to: set, for a current radar echo map in the current radar echo map sequence, a pixel value of a pixel lower than a preset pixel value in the current radar echo map to a preset value.

In some embodiments, the pre-processing subunit is further configured to: remove the current radar echo maps at least within the preset time period of a missing current radar echo map from the current radar echo map sequence.

In some embodiments, the apparatus further includes a determining unit, configured to determine whether the severe convection weather intensity predicting map satisfies a warning condition; and an alarm unit, configured to send an alarm command in response to determining that the severe convection weather intensity predicting map satisfies the warning condition.

In some embodiments, the severe convection weather predicting model includes a first encoder and a first decoder, the first encoder including a convolutional layer and a down-sampling layer, and the first decoder including a de-convolutional layer and an up-sampling layer.

In some embodiments, the severe convection weather predicting model is trained by: acquiring training samples, the training samples including historical radar echo map sequences and real historical severe convection weather intensity maps; and training the predicting model based on the training samples by using a deep learning method to obtain the severe convection weather predicting model.

In some embodiments, the training the predicting model based on the training samples by using a deep learning method to obtain the severe convection weather predicting model includes: training the predicting model, using the historical radar echo map sequences in the training samples as inputs and the real historical severe convection weather intensity maps in the training samples as outputs, to obtain the severe convection weather predicting model.

In some embodiments, the training the predicting model based on the training samples by using a deep learning method to obtain the severe convection weather predicting model includes: performing, based on the real historical severe convection weather intensity maps in the training samples, storm maturity labeling on the historical radar echo map sequences in the training samples to generate storm maturity labeling map sequences; and training the predicting model using the storm maturity labeling map sequences as inputs and the real historical severe convection weather intensity maps in the training samples as outputs to obtain the severe convection weather predicting model.

In some embodiments, after inputting the future radar echo map sequence into the pre-trained severe convection weather predicting model to obtain the severe convection weather intensity predicting map, the training further includes: acquiring real severe convection weather intensity maps corresponding to the future radar echo map sequence; generating, based on the future radar echo map sequence and the real severe convection weather intensity maps, new training samples; and training the severe convection weather predicting model based on the new training samples to update the severe convection weather predicting model.

In some embodiments, the radar echo extrapolation predicting model includes a second encoder and a second decoder, the second encoder includes a convolutional layer, a long short-term memory layer, and a down-sampling layer, and the second decoder includes a de-convolutional layer, a long short-term memory layer, and an up-sampling layer.

In a third aspect, an embodiment of the present disclosure provides a server, including: one or more processors; and a storage apparatus, storing one or more programs, where the one or more programs, when executed by the one or more processors, cause the one or more processors to implement the method according to any one of implementations in the first aspect.

In a fourth aspect, an embodiment of the present disclosure provides a computer-readable medium, storing a computer program thereon, the computer program, when executed by a processor, causes the processor to implement the method according to any one of implementations in the first aspect.

According to the method and apparatus for predicting a severe convection weather provided by the embodiment of the present disclosure, a current radar echo map sequence is first acquired; then, a future radar echo map sequence is generated based on the current radar echo map sequence; and finally, the future radar echo map sequence is input into a pre-trained severe convection weather predicting model to obtain a severe convection weather intensity predicting map. The intensity of a severe convection weather is automatically predicted using a severe convection weather predicting model, and the whole predicting process does not require human participation, which not only reduces the labor cost, but also improves the prediction accuracy of the severe convection weather.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

It should be appreciated that the specific embodiments described herein are merely used for explaining the relevant disclosure, rather than limiting the disclosure. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with embodiments.

Figure 1:
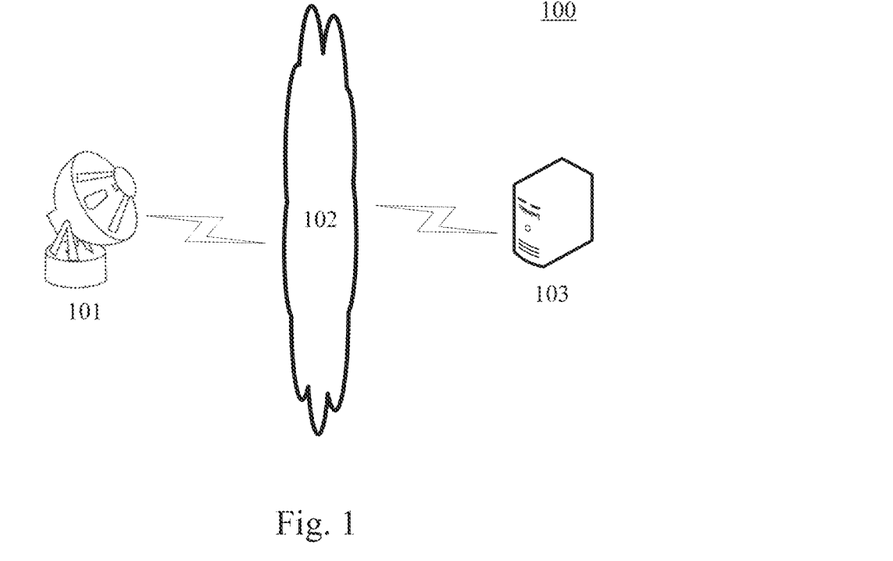
FIG. 1 is an illustrative system architecture to which some embodiments of the present disclosure may be applied.

FIG. 1 shows an exemplary system architecture 100 to which a method for predicting a severe convection weather or an apparatus for predicting a severe convection weather according to some embodiment of the present disclosure may be applied.

As shown in FIG. 1, the system architecture 100 may include a weather radar 101, a network 102, and a server 103. The network 102 serves as a medium providing a communication link between the weather radar 101 and the server 103. The network 102 may include various types of connections, such as wired or wireless communication links, or optical fiber cables.

The weather radar 101 may be composed of a directional antenna, a transmitter, a receiver, an antenna controller, a display, a camera, an electronic computer, and an image transmission, and the like. When electromagnetic waves of the transmitter of the weather radar 101 encounter clouds during propagation, the clouds reflect and scatter the electromagnetic waves, the receiver receives part of the reflected and scattered electromagnetic waves, an electronic calculator generates a radar echo map based on the intensity of the received electromagnetic waves, and the image transmission transmits the radar echo map to the server 103.

The server 103 may be a server providing various services, for example, a severe convection weather predicting server. The severe convection weather predicting server may process, such as analyze, the acquired data such as a current radar echo map sequence to generate a processing result (for example, a severe convection weather intensity predicting map).

It should be noted that the server 103 may be hardware or software. When the server 103 is hardware, the server 103 may be implemented as a distributed server cluster composed of multiple servers, or as a single server. When the server 103 is software, the server 103 may be implemented as a plurality of software programs or software modules (e.g., for providing distributed services), or as a single software program or software module. Specific limitations are not provided here.

It should be noted that the method for predicting a severe convection weather according to some embodiments of the present disclosure is generally executed by the server 103. Accordingly, the apparatus for predicting a severe convection weather is generally provided in the server 103.

It should be appreciated that the numbers of the weather radar, the network, and the server in FIG. 1 are merely illustrative. Any number of weather radars, networks, and servers may be provided based on implementation requirements.

Figure 2:
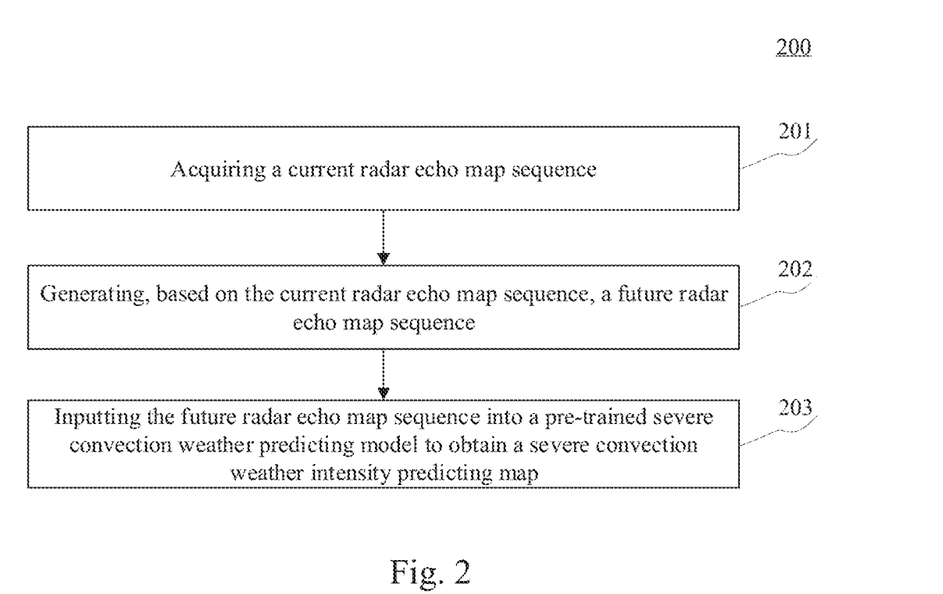
FIG. 2 is a flowchart of a method for predicting a severe convection weather according to an embodiment of the present disclosure.

Further, referring to FIG. 2, a flow 200 of a method for predicting a severe convection weather according to an embodiment of the present disclosure is shown. The method for predicting a severe convection weather includes the following steps.

Step 201: acquiring a current radar echo map sequence.

In the present embodiment, the executing body (for example, the server 103 shown in FIG. 1) of the method for predicting a severe convection weather may acquire the current radar echo map sequence from a weather radar (for example, the weather radar 101 shown in FIG. 1). The current radar echo map sequence may be a radar echo map sequence within a current time period. Generally, the current radar echo map sequence may be acquired every preset time length within the current time period. Currently, the weather radar may acquire a radar echo map every 6 minutes. For example, the current radar echo map sequence may include 10 radar echo maps acquired by the weather radar every 6 minutes within the most recent period of time.

In practice, the intensity of a radar echo may be expressed in db (decibel). A certain relationship exists between the pixel value of a radar echo map and the intensity of a radar echo. Generally, the pixel value of the radar echo map is equal to the intensity of the radar echo, multiplied by 2, and then plus 66.

Step 202: generating, based on the current radar echo map sequence, a future radar echo map sequence.

In the present embodiment, the executing body may predict, based on the current radar echo map sequence, the future radar echo map sequence. For example, the executing body may perform an echo extrapolation operation on the current radar echo map sequence to obtain the future radar echo map sequence. The future radar echo map sequence may be a radar echo map sequence within a future time period. For example, the future radar echo map sequence may include radar echo maps every 6 minutes within a future period of time.

Step 203: inputting the future radar echo map sequence into a pre-trained severe convection weather predicting model to obtain a severe convection weather intensity predicting map.

In the present embodiment, the executing body may input the future radar echo map sequence into the severe convection weather predicting model to obtain the severe convection weather intensity predicting map. The severe convection weather predicting model may be used to predict the intensity of a severe convection weather and characterize the corresponding relationship between the radar echo map sequence and the intensity of the severe convection weather.

Generally, the severe convection weather may have many phenomena such as heavy rainfall, lightning, gale and hail, so the severe convection weather predicting model may include models for predicting the intensity of each phenomenon in the severe convection weather. For example, the severe convection weather predicting model may be composed of multiple models such as a heavy rainfall predicting model, a thunder and lightning predicting model, a gale predicting model, and a hail predicting model. The heavy rainfall predicting model may be used to predict the intensity of heavy rainfall, the thunder and lightning predicting model may be used to predict the intensity of thunder and lightning, the gale predicting model may be used to predict the intensity of gale, and the hail predicting model may be used to predict the intensity of hail. The executing body may input the future radar echo map sequence into the multiple models such as the heavy rainfall predicting model, the thunder and lightning predicting model, the gale predicting model, and the hail predicting model to obtain multiple predicting maps such as a heavy rainfall intensity predicting map, a thunder and lightning intensity predicting map, a gale intensity predicting map, and a hail intensity predicting map.

In the present embodiment, the severe convection weather predicting model may be trained in a variety of ways.

In some optional implementations of the present embodiment, the executing body may collect a lot of historical radar echo map sequences and corresponding real historical severe convection weather intensity maps in advance, generate and store a corresponding relationship table as the severe convection weather predicting model. After generating the future radar echo map sequence, the executing body may first calculate the similarity between the future radar echo map sequence and each historical radar echo map sequence in the corresponding relationship table, and then determine, based on the calculated similarity, a severe convection weather intensity predicting map from the corresponding relationship table. For example, the executing body may select a real historical severe convection weather intensity map corresponding to the historical radar echo map sequence having the highest similarity to the future radar echo map sequence from the corresponding relationship table as a severe convection weather intensity predicting map.

Figure 3:
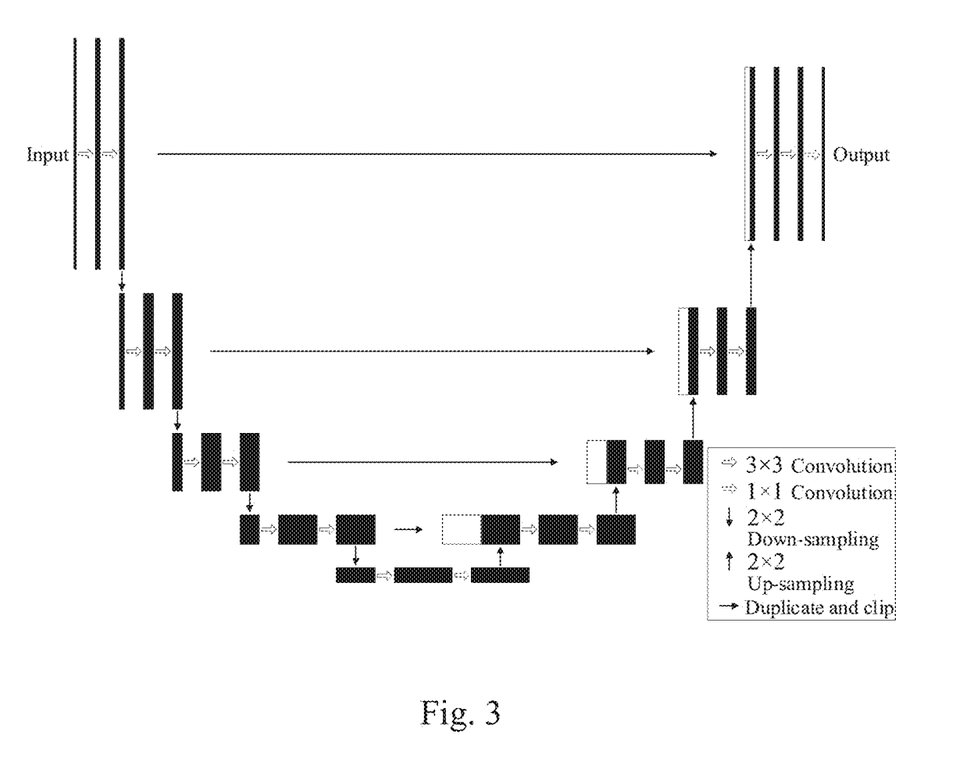
FIG. 3 is a schematic structural diagram of a severe convection weather predicting model.

In some optional implementations of the present embodiment, the severe convection weather predicting model may be obtained by supervised training of an existing machine learning model using a machine learning method and training samples. Generally, the severe convection weather predicting model may be of an encoder-decoder mode. FIG. 3 shows a schematic structural diagram of a severe convection weather predicting model. Specifically, the severe convection weather predicting model may include a first encoder and a first decoder. The first encoder may include a convolutional layer and a down-sampling layer (pooling layer). The spatial dimension of the down-sampling layer is gradually reduced by the convolutional layer and the down-sampling layer, global features are extracted, and the normalization of feature space information is completed by scale normalization. The first decoder may include a de-convolutional layer and an up-sampling layer. The details and spatial dimension of a target are gradually restored by the de-convolutional layer and the up-sampling layer. A quick connection usually exists between the first encoder and the first decoder, which may help the first decoder to better repair the details of the target. The severe convection weather predicting model belongs to a full convolutional neural network, the input and output of which are images, and the severe convection weather predicting model does not include a fully connected layer, where the shallower high resolution layer is used to solve the problem of pixel positioning, and the deeper layer is used to solve the problem of severe convection weather level. The correlation between time and space is fused, and the amount of computation is effectively reduced.

In some optional implementations of the present embodiment, the executing body may further determine whether the severe convection weather intensity predicting map satisfies a warning condition, and the executing body sends an alarm command in response to determine that the severe convection weather intensity predicting map satisfies the warning condition. Generally, when the severe convection weather intensity predicting map indicates that the intensity of the severe convection weather is high, the executing body may send an alarm command to an alarm device. In this way, the alarm device may sound an alarm to prompt timely and reasonable defense against a severe convection weather.

According to the method for predicting a severe convection weather provided by the embodiment of the present disclosure, a current radar echo map sequence is first acquired; then, a future radar echo map sequence is generated based on the current radar echo map sequence; and finally, the future radar echo map sequence is input into a pre-trained severe convection weather predicting model to obtain a severe convection weather intensity predicting map. The intensity of a severe convection weather is automatically predicted using a severe convection weather predicting model, and the whole predicting process does not require human participation, which not only reduces the labor cost, but also improves the prediction accuracy of the severe convection weather.

Figure 4:
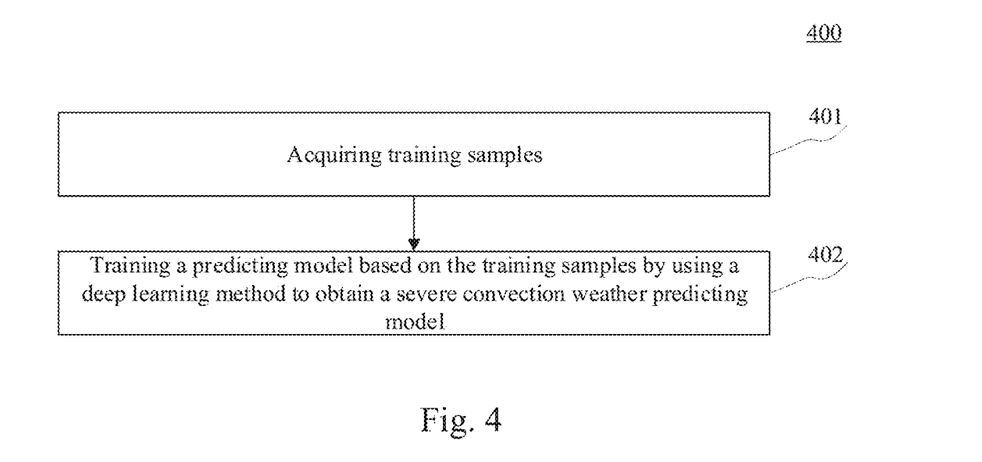
FIG. 4 is a flowchart of a method for training a severe convection weather predicting model according to an embodiment of the present disclosure.

Further referring to FIG. 4, a flow 400 of a method for training a severe convection weather predicting model according to an embodiment of the present disclosure is shown. The method for training a severe convection weather predicting model includes the following steps.

Step 401: acquiring training samples.

In the present embodiment, the executing body (for example, the server 103 shown in FIG. 1) of the method for training a severe convection weather predicting model may collect a large number of historical radar echo map sequences and corresponding real historical severe convection weather intensity maps as the training samples. Each training sample may include a historical radar echo map sequence and a corresponding real historical severe convection weather intensity map.

Step 402: training a predicting model based on the training samples by using a deep learning method to obtain a severe convection weather predicting model.

In the present embodiment, the executing body may train the predicting model based on the training samples by using the deep learning method to obtain a severe convection weather predicting model.

In some optional implementations of the present embodiment, the executing body may train the predicting model, using the historical radar echo map sequences in the training samples as inputs and the real historical severe convection weather intensity maps in the training samples as outputs, to obtain a severe convection weather predicting model. The predicting model may be of an encoder-decoder mode, and is a model that is not trained or not trained completely. Each layer of the predicting model may be set with an initial parameter, and the parameter may be continuously adjusted during training.

Figure 5:
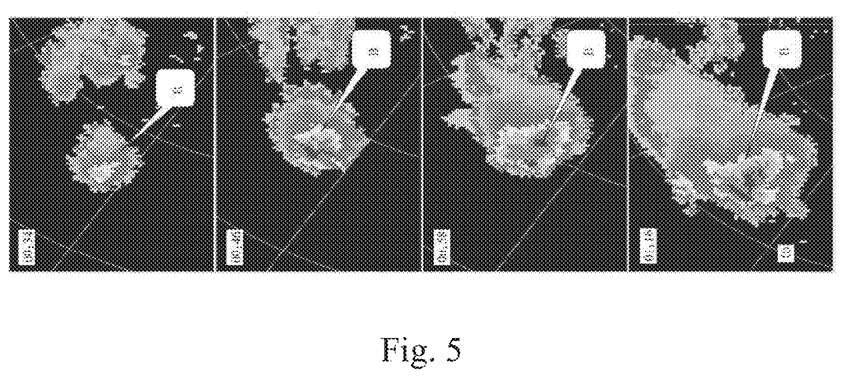
FIG. 5 is a schematic diagram of a storm development process.

In some optional implementations of the present embodiment, the executing body may first perform, based on the real historical severe convection weather intensity maps in the training samples, storm maturity labeling on the historical radar echo map sequences in the training samples to generate storm maturity labeling map sequences; and train a predicting model using the storm maturity labeling map sequences as inputs and the real historical severe convection weather intensity maps in the training samples as outputs to obtain a severe convection weather predicting model. A storm usually has three different phases of evolution, namely a cumulus phase, a maturity phase, and an extinction phase. Generally, the storm may be maintained relatively stable for more than one hour, so the severe convection weather may be effectively predicted using the storm maturity data. FIG. 5 shows a schematic diagram of a storm development process. A storm is constantly aggregated. The storm is not formed in the first picture, being aggregated in the second picture, mature in the third picture, and occurs in the last picture. From the growth characteristics of the immature storm in the first two pictures, it can be judged that a severe convection weather will occur in the future time period (for example, after 30 minutes).

Here, the storm maturity labeling process may be divided into two parts. The time and position of a historical severe convection weather are first acquired by a predicting device, then a corresponding storm on a historical radar echo map is found by a region segmentation algorithm, the motion trajectory of the storm is tracked using a detection tracking algorithm, and the maturities of the storm at different moments are labeled based on the motion trajectory.

It should be noted that the severe convection weather predicting model supports data input of any size and channel. Moreover, the severe convection weather predicting model may be effectively compatible with a variety of input data, for example, radar echo data and data of any field such as a height field and a wind field, and may also use data reanalyzed from existing historical data and values predicted by a value predicting product. The severe convection weather predicting model is also applicable to input data of multiple time dimensions, including input and output data at the same time interval and at different time intervals. For the case of different input and output time intervals, the heavy rainfall predicting model is taken as an example. The time interval of the radar echo map is generally 6 minutes, and the heavy rainfall predicting model may use ten 6-minute radar echo maps as input data and accumulate the data to obtain corresponding hourly rainfall predicting data, where the model parameters at each moment are shared. The model parameters are then adjusted based on the difference from the real hourly rainfall data.

Figure 6:
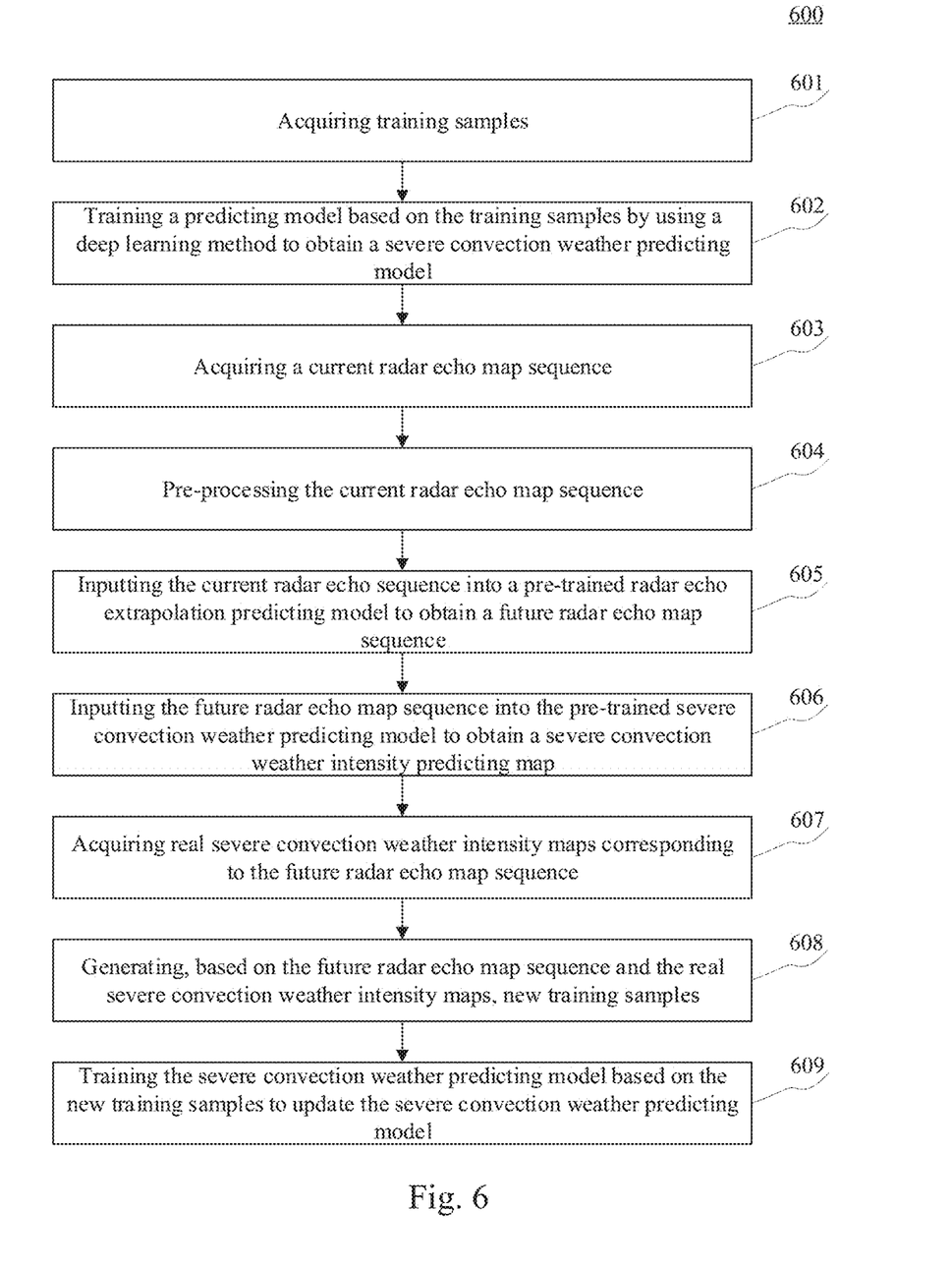
FIG. 6 is a flowchart of a method for predicting a severe convection weather according to another embodiment of the present disclosure.

Further referring to FIG. 6, a flow 600 of the method for predicting a severe convection weather according to another embodiment of the present disclosure is shown. The method for predicting a severe convection weather includes the following steps.

Step 601: acquiring training samples.

Step 602: training a predicting model based on the training samples by using a deep learning method to obtain a severe convection weather predicting model.

In the present embodiment, the specific operations of steps 601 and 602 have been described in detail in steps 401 and 402 of the embodiment shown in FIG. 2, and repeated details are not described herein again.

Step 603: acquiring a current radar echo map sequence.

In the present embodiment, the specific operation of step 603 has been described in detail in step 201 of the embodiment shown in FIG. 2, and repeated details are not described herein again.

Step 604: pre-processing the current radar echo map sequence.

In the present embodiment, the executing body (for example, the server 103 shown in FIG. 1) of the method for predicting a severe convection weather may pre-process the current radar echo map sequence. The pre-processing may include, but is not limited to, at least one of: clear-air echo filtering, failure echo filtering, or fixed noise filtering.

In some optional implementations of the present embodiment, since the intensity of a clear-air echo is usually lower than a preset intensity threshold, the pixel values of pixels of the clear-air echo are lower than a preset pixel threshold. A certain relationship exists between the preset pixel threshold and the preset intensity threshold. Generally, the preset pixel threshold is equal to the preset intensity threshold multiplied by 2, and then plus 66. For a current radar echo map in the current radar echo map sequence, the executing body may set the pixel values of pixels lower than a preset pixel value in the current radar echo map to a preset value. For example, the pixel values of the pixels lower than the preset pixel value are set to be zero.

In some optional implementations of the present embodiment, since the current radar echo map sequence is acquired every preset time length within the current time period, if a current radar echo map in the current radar echo map sequence misses, the current radar echo maps near the missing current radar echo map fail, and the executing body may remove the current radar echo maps at least within the preset time period of the missing current radar echo map from the current radar echo map sequence.

Step 605: inputting the current radar echo sequence into a pre-trained radar echo extrapolation predicting model to obtain a future radar echo map sequence.

In the present embodiment, the executing body may input the current radar echo map sequence into the pre-trained radar echo extrapolation predicting model to obtain the future radar echo map sequence. The radar echo extrapolation predicting model may be used to predict the future radar echo map sequence.

In the present embodiment, the radar echo extrapolation predicting model may be trained in a variety of ways. For example, the radar echo extrapolation predicting model may be obtained by supervised training of an existing machine learning model using a machine learning method and training samples. The radar echo extrapolation predicting model may be of an encoder-decoder mode. For example, the radar echo extrapolation predicting model may include a second encoder and a second decoder. The second encoder may include a convolutional layer, a long short-term memory layer, and a down-sampling layer. The second decoder may include a de-convolutional layer, a long short-term memory layer, and an up-sampling layer.

Step 606: inputting the future radar echo map sequence into the pre-trained severe convection weather predicting model to obtain a severe convection weather intensity predicting map.

In the present embodiment, the specific operation of step 606 has been described in detail in step 203 of the embodiment shown in FIG. 2, and the repeated details are not described herein again.

Step 607: acquiring real severe convection weather intensity maps corresponding to the future radar echo map sequence.

In the present embodiment, when the time arrives at a moment corresponding to the future radar echo map sequence, the executing body may acquire severe convection weather intensity maps at the moment, that is, the real severe convection weather intensity maps.

Step 608: generating, based on the future radar echo map sequence and the real severe convection weather intensity maps, new training samples.

In the present embodiment, the executing body may generate, based on the future radar echo map sequence and the real severe convection weather intensity maps, new training samples.

Step 609: training the severe convection weather predicting model based on the new training samples to update the severe convection weather predicting model.

In the present embodiment, the executing body may continue to train the severe convection weather predicting model by using the new training samples to update the parameters of the severe convection weather predicting model, so as to obtain a new severe convection weather predicting model. On-line learning and model update are completed based on the data acquired in real time, which avoids cold start of the model in different places, difficulty in effectively using the motion changes of clouds, etc. The accuracy of predicting the intensity of the severe convection weather is also further improved.

It can be seen from FIG. 6 that, compared with the corresponding embodiment of FIG. 2, the flow 600 of the method for predicting a severe convection weather in the present embodiment increases the steps of pre-processing the current radar echo map sequence and updating the severe convection weather predicting model on line. Therefore, the solution described in the present embodiment avoids the effects of clear-air echo, failure echo, fixed noise, and the like on the predicting result, and also avoids cold start of the model in different places, difficulty in effectively using the motion changes of clouds, etc. The accuracy of predicting the intensity of the severe convection weather is also further improved.

Figure 7:
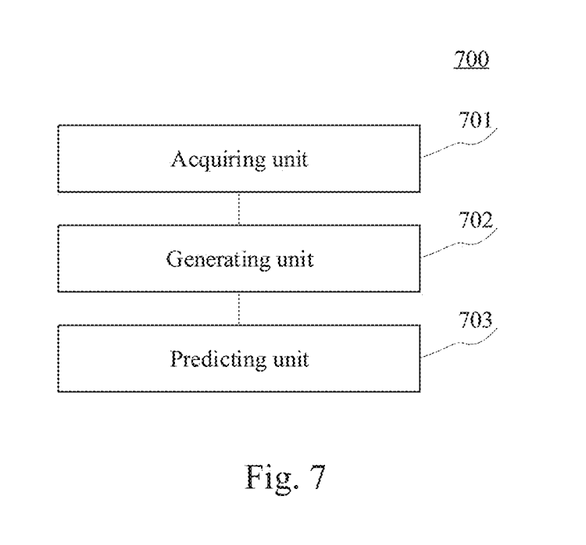
FIG. 7 is a schematic structural diagram of an apparatus for predicting a severe convection weather according to an embodiment of the present disclosure.

Further referring to FIG. 7, as an implementation of the method shown in the above figures, an embodiment of the present disclosure provides an apparatus for predicting a severe convection weather. The embodiment of the apparatus corresponds to the embodiment of the method shown in FIG. 2, and the apparatus may be applied to various electronic devices.

As shown in FIG. 7, the apparatus 700 for predicting a severe convection weather according to the present embodiment may include an acquiring unit 701, a generating unit 702, and a predicting unit 703. The acquiring unit 701 is configured to acquire a current radar echo map sequence, the current radar echo map sequence being a radar echo map sequence within a current time period; the generating unit 702 is configured to generate, based on the current radar echo map sequence, a future radar echo map sequence, the future radar echo map sequence being a radar echo map sequence within a future time period; the predicting unit 703 is configured to input the future radar echo map sequence into a pre-trained severe convection weather predicting model to obtain a severe convection weather intensity predicting map, where the severe convection weather predicting model is used to predict an intensity of a severe convection weather.

In the present embodiment, the specific processing of the acquiring unit 701, the generating unit 702, and the predicting unit 703 of the apparatus 700 for predicting a severe convection weather and the technical effects thereof may be referred to the related description in step 201, step 202, and step 203 in the corresponding embodiment of FIG. 2, respectively. The description will not be repeated here.

In some optional implementations of the present embodiment, the generating unit 702 includes: a generating subunit (not shown in the figures), configured to input the current radar echo sequence into a pre-trained radar echo extrapolation predicting model to obtain the future radar echo map sequence.

In some optional implementations of the present embodiment, the generating unit 702 further includes: a preprocessing subunit (not shown in the figures), configured to pre-process the current radar echo map sequence, where the preprocessing includes at least one of the following: clear-air echo filtering, failure echo filtering, or fixed noise filtering.

In some optional implementations of the present embodiment, the pre-processing subunit is further configured to: set, for a current radar echo map in the current radar echo map sequence, a pixel value of a pixel lower than a preset pixel value in the current radar echo map to a preset value.

In some optional implementations of the present embodiment, the pre-processing subunit is further configured to: remove the current radar echo maps at least within the preset time period of a missing current radar echo map from the current radar echo map sequence.

In some optional implementations of the present embodiment, the apparatus 700 for predicting a severe convection weather further includes: a determining unit (not shown in the figures), configured to determine whether the severe convection weather intensity predicting map satisfies a warning condition; and an alarm unit (not shown in the figures), configured to send an alarm command in response to determining that the severe convection weather intensity predicting map satisfies the warning condition.

In some optional implementations of the present embodiment, the severe convection weather predicting model includes a first encoder and a first decoder, the first encoder including a convolutional layer and a down-sampling layer, and the first decoder including a de-convolutional layer and an up-sampling layer.

In some optional implementations of the present embodiment, the severe convection weather predicting model is trained by: acquiring training samples, the training samples including historical radar echo map sequences and real historical severe convection weather intensity maps; and training the predicting model based on the training samples by using a deep learning method to obtain the severe convection weather predicting model.

In some optional implementations of the present embodiment, the training the predicting model based on the training samples by using a deep learning method to obtain the severe convection weather predicting model includes: training the predicting model, using the historical radar echo map sequences in the training samples as inputs and the real historical severe convection weather intensity maps in the training samples as outputs, to obtain the severe convection weather predicting model.

In some optional implementations of the present embodiment, the training the predicting model based on the training samples by using a deep learning method to obtain the severe convection weather predicting model includes: performing, based on the real historical severe convection weather intensity maps in the training samples, storm maturity labeling on the historical radar echo map sequences in the training samples to generate storm maturity labeling map sequences; and training the predicting model using the storm maturity labeling map sequences as inputs and the real historical severe convection weather intensity maps in the training samples as outputs to obtain the severe convection weather predicting model.

In some optional implementations of the present embodiment, after inputting the future radar echo map sequence into the pre-trained severe convection weather predicting model to obtain the severe convection weather intensity predicting map, the training further includes: acquiring real severe convection weather intensity maps corresponding to the future radar echo map sequence; generating, based on the future radar echo map sequence and the real severe convection weather intensity maps, new training samples; and training the severe convection weather predicting model based on the new training samples to update the severe convection weather predicting model.

In some optional implementations of the present embodiment, the radar echo extrapolation predicting model includes a second encoder and a second decoder, the second encoder includes a convolutional layer, a long short-term memory layer, and a down-sampling layer, and the second decoder includes a de-convolutional layer, a long short-term memory layer, and an up-sampling layer.

Hereinafter, referring to FIG. 8, a schematic structural diagram of a computer system 800 adapted to implement a server (for example, the server 103 shown in FIG. 1) of the embodiments of the present disclosure is shown. The server shown in FIG. 8 is merely an example, and should not limit the function and scope of use of the embodiments of the present disclosure.

Figure 8:
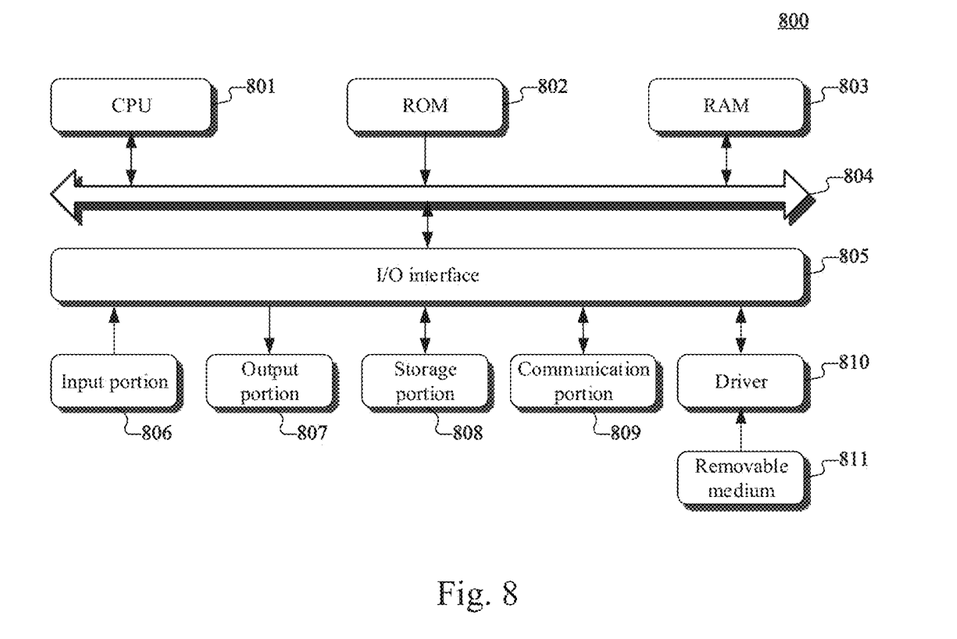
FIG. 8 is a schematic structural diagram of a computer system adapted to implement a server of embodiments of the present disclosure.

As shown in FIG. 8, the computer system 800 includes a central processing unit (CPU) 801, which may execute various appropriate operations and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802, and the RAM 803 are connected to each other through a bus 804. An input/output (I/O) interface 805 is also connected to the bus 804.

The following components are connected to the I/O interface 805: an input portion 806 including a keyboard, a mouse, or the like; an output portion 807 including a cathode ray tube (CRT), a liquid crystal display device (LCD), a speaker, or the like; a storage portion 808 including a hard disk or the like; and a communication portion 809 including a network interface card, such as a LAN card and a modem. The communication portion 809 performs communication processes via a network, such as the Internet. A driver 810 is also connected to the I/O interface 805 as required. A removable medium 811, such as a magnetic disk, an optical disk, a magneto-optical disk, and a semiconductor memory, may be installed on the driver 810, so that a computer program read therefrom is installed on the storage portion 808 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication portion 809, and/or may be installed from the removable media 811. The computer program, when executed by the CPU 801, implements the functions as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The units described may also be provided in a processor, for example, described as: a processor includes an acquiring unit, a generating unit, and a predicting unit. Here, the names of these units do not in some cases constitute a limitation to such units themselves. For example, the acquiring unit may also be described as "a unit configured to acquire a current radar echo map sequence".

In another aspect, an embodiment of the present disclosure further provides a computer-readable medium. The computer-readable storage medium may be included in the server in the above described embodiments, or a stand-alone computer-readable medium not assembled into the apparatus. The computer-readable medium stores one or more programs. The one or more programs, when executed by the server, cause the server to: acquire a current radar echo map sequence, the current radar echo map sequence being a radar echo map sequence within a current time period; generate, based on the current radar echo map sequence, a future radar echo map sequence, the future radar echo map sequence being a radar echo map sequence within a future time period; input the future radar echo map sequence into a pre-trained severe convection weather predicting model to obtain a severe convection weather intensity predicting map, where the severe convection weather predicting model is used to predict the intensity of a severe convection weather.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for predicting a severe convection weather, comprising:
acquiring a current radar echo map sequence from a weather radar, the current radar echo map sequence being a radar echo map sequence within a current time period;
generating, based on the current radar echo map sequence, a future radar echo map sequence, the future radar echo map sequence being a radar echo map sequence within a future time period;
inputting the future radar echo map sequence into a pre-trained severe convection weather predicting model to obtain a severe convection weather intensity predicting map, for predicting an intensity of a severe convection weather;
acquiring real severe convection weather intensity maps corresponding to the future radar echo map sequence;
generating, based on the future radar echo map sequence and the real severe convection weather intensity maps, new training samples; and
training the severe convection weather predicting model based on the new training samples to update the severe convection weather predicting model,
wherein the severe convection weather predicting model comprises a first encoder and a first decoder, the first encoder comprising a convolutional layer and a down-sampling layer, and the first decoder comprising a de-convolutional layer and an up-sampling layer, and
wherein the severe convection weather predicting model is trained by:
acquiring training samples, the training samples comprising historical radar echo map sequences and real historical severe convection weather intensity maps; and
training the predicting model based on the training samples by using a deep learning method to obtain the severe convection weather predicting model.

2. The method according to claim 1, wherein the generating, based on the current radar echo map sequence, a future radar echo map sequence comprises:
inputting the current radar echo sequence into a pre-trained radar echo extrapolation predicting model to obtain the future radar echo map sequence.

3. The method according to claim 2, wherein before inputting the current radar echo sequence into the pre-trained radar echo extrapolation predicting model to obtain the future radar echo map sequence, the method further comprises:
pre-processing the current radar echo map sequence, wherein the preprocessing comprises at least one of: clear-air echo filtering, failure echo filtering, or fixed noise filtering.

4. The method according to claim 3, wherein the pre-processing the current radar echo map sequence comprises:
setting, for a current radar echo map in the current radar echo map sequence, a pixel value of a pixel lower than a preset pixel value in the current radar echo map to a preset value.

5. The method according to claim 4, wherein the pre-processing the current radar echo map sequence comprises:
removing the current radar echo maps at least within the preset time period of a missing current radar echo map from the current radar echo map sequence.

6. The method according to claim 1, wherein the method further comprises:
determining whether the severe convection weather intensity predicting map satisfies a warning condition; and
sending an alarm command in response to determining that the severe convection weather intensity predicting map satisfies the warning condition.

7. The method according to claim 1, wherein the training the predicting model based on the training samples by using a deep learning method to obtain the severe convection weather predicting model comprises: training the predicting model, using the historical radar echo map sequences in the training samples as inputs and the real historical severe convection weather intensity maps in the training samples as outputs, to obtain the severe convection weather predicting model.

8. The method according to claim 1, wherein the training the predicting model based on the training samples by using a deep learning method to obtain the severe convection weather predicting model comprises: performing, based on the real historical severe convection weather intensity maps in the training samples, storm maturity labeling on the historical radar echo map sequences in the training samples to generate storm maturity labeling map sequences; and training the predicting model using the storm maturity labeling map sequences as inputs and the real historical severe convection weather intensity maps in the training samples as outputs to obtain the severe convection weather predicting model.

9. The method according to claim 2, wherein the radar echo extrapolation predicting model comprises a second encoder and a second decoder, the second encoder comprising a convolutional layer, a long short-term memory layer, and a down-sampling layer, and the second decoder comprising a de-convolutional layer, a long short-term memory layer, and an up-sampling layer.

10. An apparatus for predicting a severe convection weather, comprising:
at least one processor; and
a memory storing instructions, wherein the instructions when executed by the at least one processor, cause the at least one processor to perform operations, the operations comprising:
acquiring a current radar echo map sequence from a weather radar, the current radar echo map sequence being a radar echo map sequence within a current time period;
generating, based on the current radar echo map sequence, a future radar echo map sequence, the future radar echo map sequence being a radar echo map sequence within a future time period;
inputting the future radar echo map sequence into a pre-trained severe convection weather predicting model to obtain a severe convection weather intensity predicting map, for predicting an intensity of a severe convection weather;
acquiring real severe convection weather intensity maps corresponding to the future radar echo map sequence;
generating, based on the future radar echo map sequence and the real severe convection weather intensity maps, new training samples; and
training the severe convection weather predicting model based on the new training samples to update the severe convection weather predicting model,
wherein the severe convection weather predicting model comprises a first encoder and a first decoder, the first encoder comprising a convolutional layer and a down-sampling layer, and the first decoder comprising a de-convolutional layer and an up-sampling layer, and wherein the severe convection weather predicting model is trained by:
acquiring training samples, the training samples comprising historical radar echo map sequences and real historical severe convection weather intensity maps; and
training the predicting model based on the training samples by using a deep learning method to obtain the severe convection weather predicting model.

11. The apparatus according to claim 10, wherein the generating, based on the current radar echo map sequence, a future radar echo map sequence comprises:
inputting the current radar echo sequence into a pre-trained radar echo extrapolation predicting model to obtain the future radar echo map sequence.

12. The apparatus according to claim 10, wherein the training the predicting model based on the training samples by using a deep learning method to obtain the severe convection weather predicting model comprises: training the predicting model, using the historical radar echo map sequences in the training samples as inputs and the real historical severe convection weather intensity maps in the training samples as outputs, to obtain the severe convection weather predicting model.

13. The apparatus according to claim 10, wherein the training the predicting model based on the training samples by using a deep learning method to obtain the severe convection weather predicting model comprises: performing, based on the real historical severe convection weather intensity maps in the training samples, storm maturity labeling on the historical radar echo map sequences in the training samples to generate storm maturity labeling map sequences; and training the predicting model using the storm maturity labeling map sequences as inputs and the real historical severe convection weather intensity maps in the training samples as outputs to obtain the severe convection weather predicting model.

14. The apparatus according to claim 11, wherein the radar echo extrapolation predicting model comprises a second encoder and a second decoder, the second encoder comprising a convolutional layer, a long short-term memory layer, and a down-sampling layer, and the second decoder comprising a de-convolutional layer, a long short-term memory layer, and an up-sampling layer.

* * * * *